United States Patent [19]

Pope

[11] Patent Number: 5,262,991
[45] Date of Patent: Nov. 16, 1993

[54] DEVICE WITH MULTIPLEXED AND NON-MULTIPLEXED ADDRESS AND DATA I/O CAPABILITY

[75] Inventor: Steven M. Pope, Los Gatos, Calif.

[73] Assignee: Zilog, Inc., Campbell, Calif.

[21] Appl. No.: 797,111

[22] Filed: Nov. 22, 1991

[51] Int. Cl.⁵ ................................. G11C 8/00
[52] U.S. Cl. ..................... 365/189.02; 365/193; 365/230.02
[58] Field of Search ............ 365/189.02, 230.02, 365/193

[56] References Cited

U.S. PATENT DOCUMENTS

| | | | |
|---|---|---|---|
| 4,306,928 | 12/1981 | McElroy | 364/900 |
| 4,349,870 | 9/1982 | Shaw et al. | 364/200 |
| 4,435,792 | 3/1985 | Bechtolsheim | 365/189.02 |
| 4,443,864 | 4/1984 | McElroy | 364/900 |
| 4,450,538 | 5/1984 | Shirasaka | 365/189.02 |
| 4,660,181 | 4/1987 | Saito et al. | 365/189.02 |
| 4,694,394 | 9/1987 | Costantini | 364/200 |
| 4,882,709 | 11/1989 | Wyland | 365/189.02 |
| 4,933,910 | 6/1990 | Olson et al. | 365/230.02 X |
| 4,961,172 | 10/1990 | Shubat et al. | 365/189.02 |
| 4,970,692 | 11/1990 | Ali et al. | 365/230.02 X |
| 5,086,407 | 2/1992 | McGarity et al. | 395/800 |
| 5,127,095 | 6/1992 | Kadono | 364/425 |

OTHER PUBLICATIONS

Motorola article, MC6801 MC6803 MC6803NR, pp. 4-84 to 4-125, Nov. 1992.
"High Performance 16-Bit CMOS Single-Chip Microcontroller," Siemens Product Information on SAB 80C166/83C166, pp. 36-37, Jan. 1992.
"CMOS Z8® Digital Signal Processor," Zilog Advance Product Specification on Z86C94, pp. 1-57, Jan. 1992.

*Primary Examiner*—Eugene R. LaRoche
*Assistant Examiner*—Do Hyun Yoo
*Attorney, Agent, or Firm*—Majestic, Parsons, Siebert & Hsue

[57] ABSTRACT

An electronic device receives data from an EEPROM by sending address information to it on one set of leads and receiving data back from it through a different set of multiplexed address/data leads. The electronic device also sends and receives data to and from a data path controller by sending address information and sending or receiving data information to or from it through the set of multiplexed address/data leads. Selection of which device, the EEPROM or the data path controller, to communicate with is made by the electronic device setting appropriate values for chip select and chip enable commands. Synchronization of the sending and receiving of the address and data information is accomplished by the use of address and data strobe signals generated by the electronic device and connected, as appropriate, with the EEPROM and data path controller.

3 Claims, 8 Drawing Sheets

Figure 1.

Prior Art

| No. | Symbol | Function | Direction |
| --- | --- | --- | --- |
| 1 | P27 | Port 2 Pin 7 | Input/Output |
| 2 | $V_{SS}$ | Digital Ground | Input |
| 3 | $AN_{GND}$ | Analog Ground | Input |
| 4 | $AV_{CC}$ | Analog Power Supply | Input |
| 5 | $VA_{HI}$ | High Ref Volt, A/D | Input |
| 6 | $VA_{LO}$ | Low Ref Volt, A/D | Input |
| 7-11 | ANA0-ANA4 | Input to A/D, Pins 0-4 | Input |
| 12 | N/C | No Connect | |
| 13-15 | ANA5-ANA7 | Input to AD, Pins 5-7 | Input |
| 16 | $VD_{LO}$ | Low Ref Volt, DAC | Input |
| 17 | DAC | D/A Converter Output | Output |
| 18 | VDHI | High Ref Volt, DAC | Input |
| 19 | $V_{DD}$ | Digital Power Supply | Input |
| 20-22 | P37-P35 | Port 3, Pins 7-5 | Output |
| 23-26 | P33-P30 | Port 3, Pins 3-0 | Input |
| 27 | XTAL1 | Crystal, OSC CLK | Input |
| 28 | XTAL2 | Crystal, OSC CLK | Output |
| 29 | PWM | Pulse Width Modulator | Output |
| 30 | /RESET | Reset | Input |
| 31 | SCLK | System Clock | Output |
| 32 | SYNC | Synchronize Pin | Output |
| 33 | IACK | Interrupt Acknowledge | Output |
| 34 | P34 | Port 3, Pin 4 | Output |
| 35 | /AS | Address Strobe | Output |
| 36 | /DS | Data Strobe | Output |
| 37 | R/W | Read/Write | Output |
| 38-44 | AD7-AD1 | MUX ADD/DATA, Pins 7-1 | Input, Output |
| 45 | $V_{SS}$ | Digital Ground | Input |
| 46 | $V_{DD}$ | Digital Power Supply | Input |
| 47-50 | A0-A3 | External Address | Output |
| 51 | N/C | No Connect | |
| 52 | A4 | External Address | Output |
| 53 | N/C | No Connect | |
| 54-64 | A5-A15 | External Address | Output |
| 65 | $V_{SS}$ | Digital Ground | Input |
| 66 | $V_{DD}$ | Digital Power Supply | Input |
| 67 | DO | SPI Data Out | Output |
| 68 | DI | SPI Data In | Input |
| 69 | SK | SPI Clock | Input, Output |
| 70 | SLAVESEL | Slave Select | Input |
| 71 | DSP_RW | Emulation R/W Pin | Output |
| 72 | DSP_SYNC | Emulation SYNC Pin | Output |
| 73-74 | C02-C01 | Compare Outputs for Timer 2 | Output |
| 75 | DSP_SSN | Emulation Single Step Pin | Output |
| 76 | N/C | No Connect | |
| 77 | /WAIT | Wait | Input |
| 78-84 | P20-P26 | Port 2, Pins 0-6 | Input, Output |

Figure 8.

DEVICE WITH MULTIPLEXED AND NON-MULTIPLEXED ADDRESS AND DATA I/O CAPABILITY

BACKGROUND OF THE INVENTION

This invention relates in general to the transfer of data between an electronic device and two or more memory or peripheral devices and in particular, where at least one of the memory or peripheral devices requires that its input and output ("I/O") for the data and the data's address be non-multiplexed and on separate leads, and at least one other memory or peripheral device requires that its I/O for the data and the data's address be multiplexed through the same leads.

Many memory or peripheral devices such as EEPROMs, have separate address and data I/O leads and in turn, require separate address and data I/O communication capability from electronic devices to and from which they transmit data. These devices maximize their read/write data access speeds at the expense of increasing their required number of I/O leads.

However, some memory or peripheral devices and especially, certain peripheral devices such as data path controllers, have a single set of I/O leads through which address and data signals are multiplexed and in turn, require electronic devices to and from which they transmit data to also provide a corresponding set of I/O leads through which address and data signals are multiplexed. These devices minimize the number of their required I/O leads at the expense of slowing down their effective read/write data access times.

Frequently, it is desirable for an electronic device such as a microprocesser ("$\mu P$") to communicate in the same system with memory or peripheral devices of both types. In order to do so, the $\mu P$ or the $\mu P$ in conjunction with additional logic external to the $\mu P$, must provide address and data signals to both types of devices that are compatible with their different I/O needs.

Figure 1:
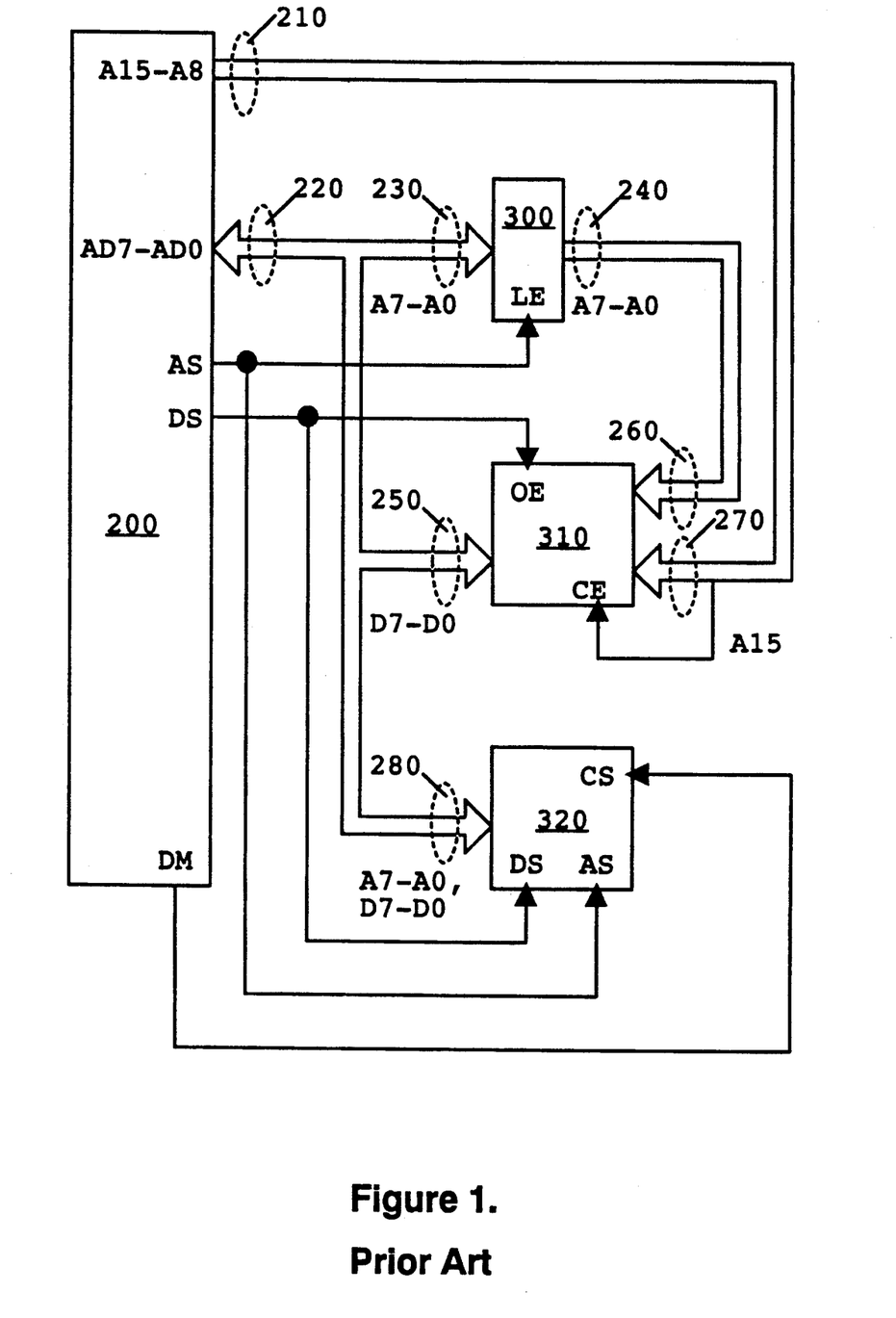
FIG. 1 is a block diagram illustrating a prior art, address/data I/O configuration between an electronic device (200) and two external memory devices (310, 320), one memory device requiring multiplexed address/data I/O and the other, non-multiplexed address and data I/O.

FIG. 1 illustrates one example of a prior art circuit for accomplishing this. A $\mu P$ 200 multiplexes and transmits the lower 8-bits of an address, A7–A0, with 8-bits of data, D7–D0, through one set of eight I/O leads 220, and transmits the upper 8-bits of the address, A15–A8, through a separate set of eight I/O leads 210.

An 8-bit address latch 300 receives the multiplexed address/data signals, AD7–AD0, at its I/O leads 230, and latches in only the 8-bit address information, A7–A0, for temporary storage. Storage of only the address information is accomplished by connecting the address strobe signal ("AS") generated by the $\mu P$ 200 to the latch enable ("LE") of the 8-bit latch 300.

Device 310 is a 32K×8 memory device that receives a 15-bit address, A14–A0, and receives or transmits 8 bits of data, D7–D0, through separate I/O leads, 260, 270 and 250 respectively. To interface with the $\mu P$ 200, the chip enable ("CE") of the memory device 310 is connected to the 16th address bit, A15, from I/O leads 210. The 16th address bit is used for this purpose, because it is otherwise not used when addressing only 32k address locations.

When the $\mu P$ 200 reads data from the memory device 310, the memory device 310 receives at its I/O leads 260 the lower 8-bits of the data's address from the output leads 240 of the address latch 300, and at its I/O leads 270, the upper 7-bits of the data's address from the first 7 of the set of 8 I/O leads 210. The 8-bit data is then strobed out of the memory device 310 through its I/O leads 250 and to the set of multiplexed address/data I/O leads 220 of $\mu P$ 200 by the data strobe signal ("DS") which is generated by the $\mu P$ 200 and connected to the output enable ("OE") of the memory device 310.

Device 320 is a 256×8 memory device that requires its 8-bit address, A7–A0, and 8-bit data I/O, D7–D0, to be multiplexed and received/transmitted through the same 8 I/O leads 280. To interface with the $\mu P$ 200, the chip select ("CS") of the memory device 320 is connected to a data memory control bit ("DM") generated by the $\mu P$ 200.

The memory device 320 then receives/transmits its multiplexed address/data I/O, AD7–AD0, directly from the I/O leads 220 of the $\mu P$ 200, which are connected to its I/O leads 280. The 8-bit address and data information are strobed off and on the set of the I/O leads 280 under the control of the AS and DS signals, respectively, which originate from the $\mu P$ 200 and connect to their respective pin counterparts on the memory device 320.

Although the example of FIG. 1 provides effective communication between the $\mu P$ 200 and the two external memory devices 310 and 320, in many applications where printed circuit board space is at a premium, the requirement of an additional component such as the 8-bit latch 300 is objectionable. For these applications, an interface configuration that does not require additional interface components is desirable.

Therefore, it is a primary object of the present invention to provide an address/data I/O structure for an electronic device, such as a $\mu P$, which can communicate with memory or peripheral devices with address-/data I/O structures such as those of devices 310 and 320, respectively, without the necessity of adding additional interface components to the system circuitry.

SUMMARY OF THE INVENTION

This and additional objects are accomplished by the various aspects of the present invention, wherein briefly stated, one aspect of the invention accomplishes these objects by means of an I/O configuration for an electronic device which includes a first set of leads or electrical contacts through which only address information is transmitted, and a second set of leads or electrical contacts different from the first, through which identical address information is multiplexed with data information.

When the electronic device interfaces with a memory or peripheral device which has separate address and data I/O leads or electrical contacts, the first set of leads or electrical contacts of the electronic device is connected to the address input leads or electrical contacts of the memory or peripheral device, and the second set of leads or electrical contacts of the electronic device is connected to the data I/O leads or electrical contacts of the memory or peripheral device. The data is then strobed onto or off of the second set of leads or electrical contacts of the electronic device by the memory or peripheral device under the control of a data strobe signal initiated by the electronic device.

On the other hand, when the electronic device interfaces with a memory or peripheral device which requires that it receive and/or transmit its address and data information multiplexed through the same I/O leads or electrical contacts, the second set of leads or electrical contacts of the electronic device is connected to the address/data I/O leads or electrical contacts of the memory or peripheral device. The address and data are then strobed onto or off of the second set of leads or electrical contacts of the electronic device by the memory or peripheral device under the control of address strobe and data strobe signals generated by the electronic device.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 8 describes the I/O pin assignments for the packaged electronic device of FIG. 7.

DETAILED DESCRIPTION OF THE PREFERRED EMBODIMENT

Figure 2:
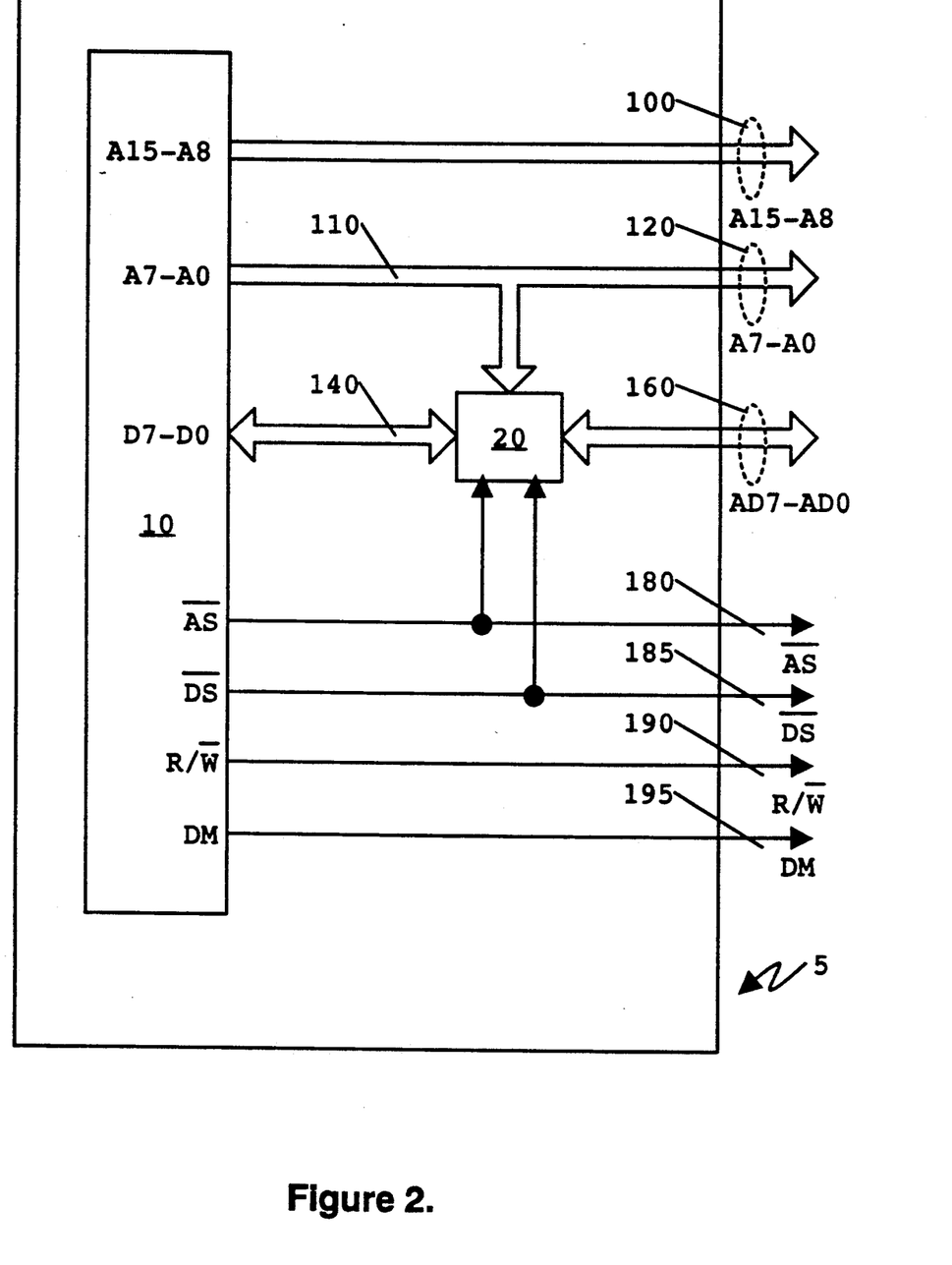
FIG. 2 is a block diagram of an electronic device (5) having an address and data I/O configuration which illustrates aspects of the present invention.

Referring to FIG. 2, an electronic device 5 is shown having 16 address leads, separated into a first group 100 and a second group 120, for transmitting 16 address bits, separated into a first group A15-A8 and a second group A7-A0; 8 address/data leads 160, for transmitting 8 address bits, A7-A0, multiplexed with 8 data bits, D7-D0, on a multiplexed address/data signal, AD-7-AD0; and 4 control leads, 180, 185, 190 and 195, for transmitting 4 control signals, $\overline{AS}$, $\overline{DS}$, R/$\overline{W}$, and DM.

Within electronic device 5, an electronic circuit 10 generates the 16 address bits, A15-A0, and transmits them to the address leads 100 and 120. The electronic circuit 10 also generates the 4 control signals $\overline{AS}$, $\overline{DS}$, R/$\overline{W}$, and DM, and transmits them to their respective control leads 180, 185, 190, and 195. In addition, the electronic circuit 10 generates or receives the 8 data bits, D7-D0, and transmits them to or receives them from a multiplexer 20 via lines 140. Also within electronic device 5, the multiplexer 20 multiplexes or de-multiplexes the address and data bits, A7-A0 and D7-D0 respectively. When data is to be transmitted from the electronic circuit 10, the multiplexer 20 multiplexes the address and data bits by transmitting to the leads 160, the address bits, which it receives from lines 110, when the address strobe AS is LOW, and the data bits, which it receives from lines 140, when the data strobe $\overline{DS}$ is LOW.

Conversely, when data is to be received by the electronic circuit 10, the multiplexer 20 de-multiplexes the address and data bits by receiving from the leads 160 a timed data signal from which it can strobe out the data bits, D7-D0, when the data strobe $\overline{DS}$ is LOW.

Figure 3:
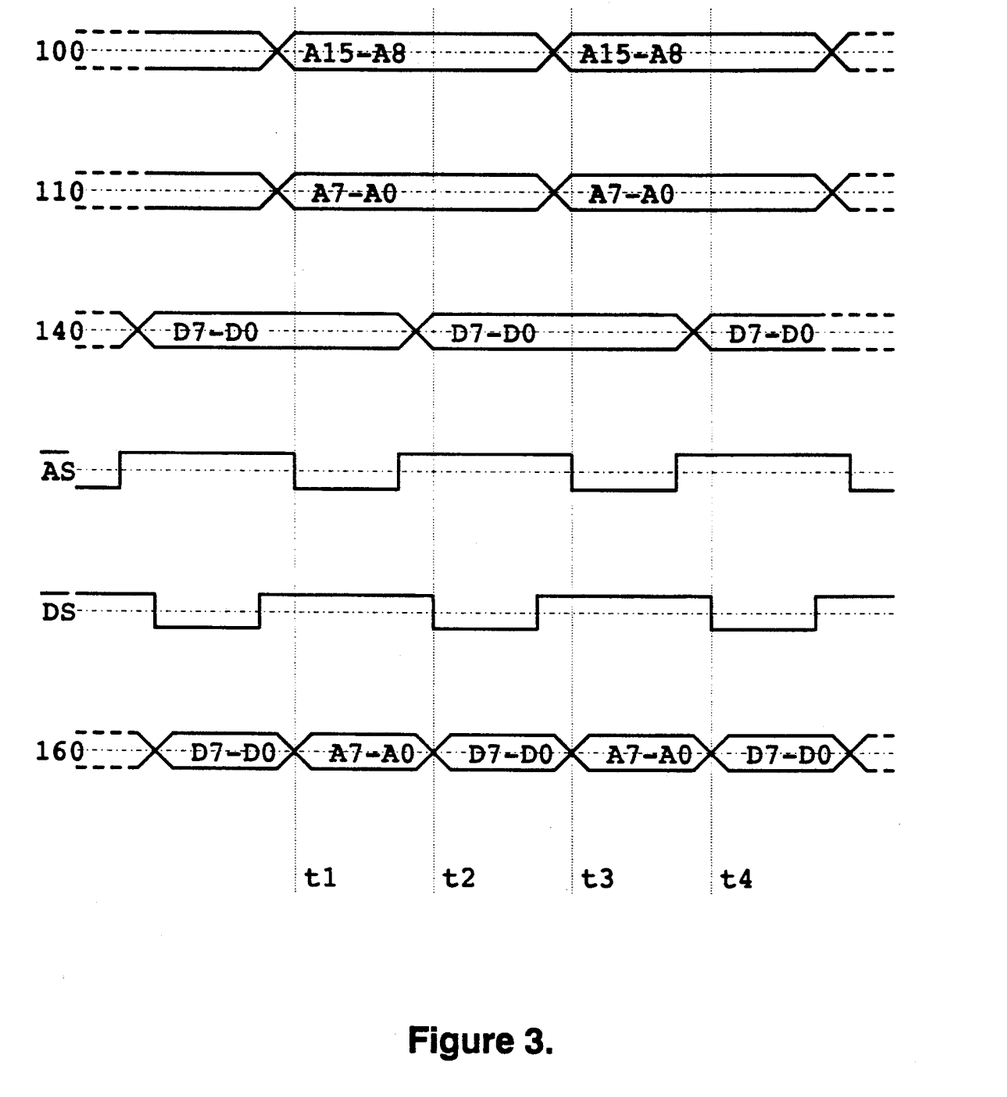
FIG. 3 illustrates timing diagrams for the generation, by the multiplexer (20), of the multiplexed address/data signal (160) from the non-multiplexed address and data signals (120, 140) when data is to be transmitted to an external device by the electronic device (5), as well as, timing diagrams for the de-multiplexing, by the multiplexer (20), of the multiplexed address/data signal (160) when data is to be received from an external device by the electronic device (5)

FIG. 3 illustrates timing diagrams for the generation by the multiplexer 20 of the multiplexed address/data signal to the leads 160. The multiplexer 20 receives both the address bits, A7-A0, via lines 110, and the data bits, D7-D0, via lines 140, as well as, the address strobe signal, $\overline{AS}$, via line 180, and the data strobe signal, $\overline{DS}$, via line 185. When the address strobe signal, $\overline{AS}$, goes LOW, such as at times t1 and t3, the address bits, A7-A0, are strobed out of the multiplexer 20 to the leads 160. Conversely, when the data strobe signal, $\overline{DS}$, goes LOW, such as at times t2 and t4, the data bits, D7-D0, are strobed out of the multiplexer 20 to the leads 160. Thus, by alternating the address and data strobe signals, an alternating or multiplexed address and data signal can be strobed to the leads 160 by the multiplexer 20.

Timing diagrams for the de-multiplexing of the data signal from the multiplexed address/data signal from leads 160 can also be seen from the figure. When the data strobe signal, $\overline{DS}$, goes LOW, such as at times t2 and t4, the data bits, D7-D0, are strobed out of the multiplexer 20 to the lines 140. When the data strobe signal, $\overline{DS}$, is HIGH, such as at times t1 and t3, the multiplexer 20 ignores the information from the leads 160 and continues to output the previously strobed data bits, D7-D0, to the lines 140.

Figure 4:
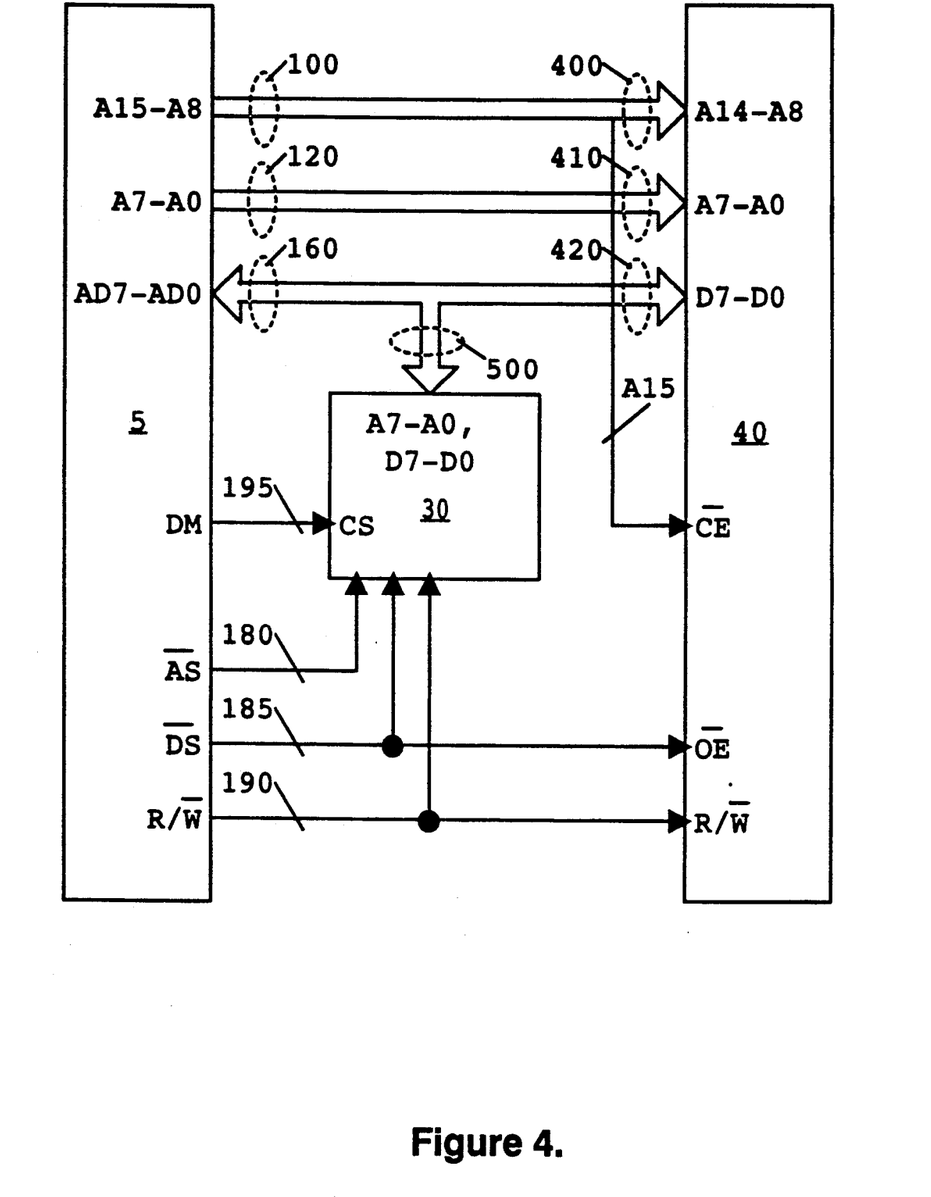
FIG. 4 is a block diagram illustrating an address/data I/O configuration for the electronic device (5) and a 32K×8 EEPROM (40) and a data path controller (30)

FIG. 4 illustrates the connection of the electronic device 5 to a 32K×8 EEPROM 40, which requires that its I/O for the address and data be non-multiplexed and be on separate leads, 400, 410 and 420, respectively, and to a data path controller 30, which requires that its I/O for the address and data be multiplexed through the same leads, 500.

The 32K×8 EEPROM 40 has its chip enable, $\overline{CE}$, connected to the A15 address lead of the electronic device 5, its address inputs, A14-A0, connected to the corresponding address leads of the electronic device 5, its data inputs, D7-D0, connected to the multiplexed address/data leads, AD7-AD0, of the electronic device 5, its output enable, $\overline{OE}$, connected to the data strobe lead, $\overline{DS}$, from the electronic device 5, and its read/write input, R/$\overline{W}$, connected to the corresponding read/write output, R/$\overline{W}$, of the electronic device 5.

Figure 5:
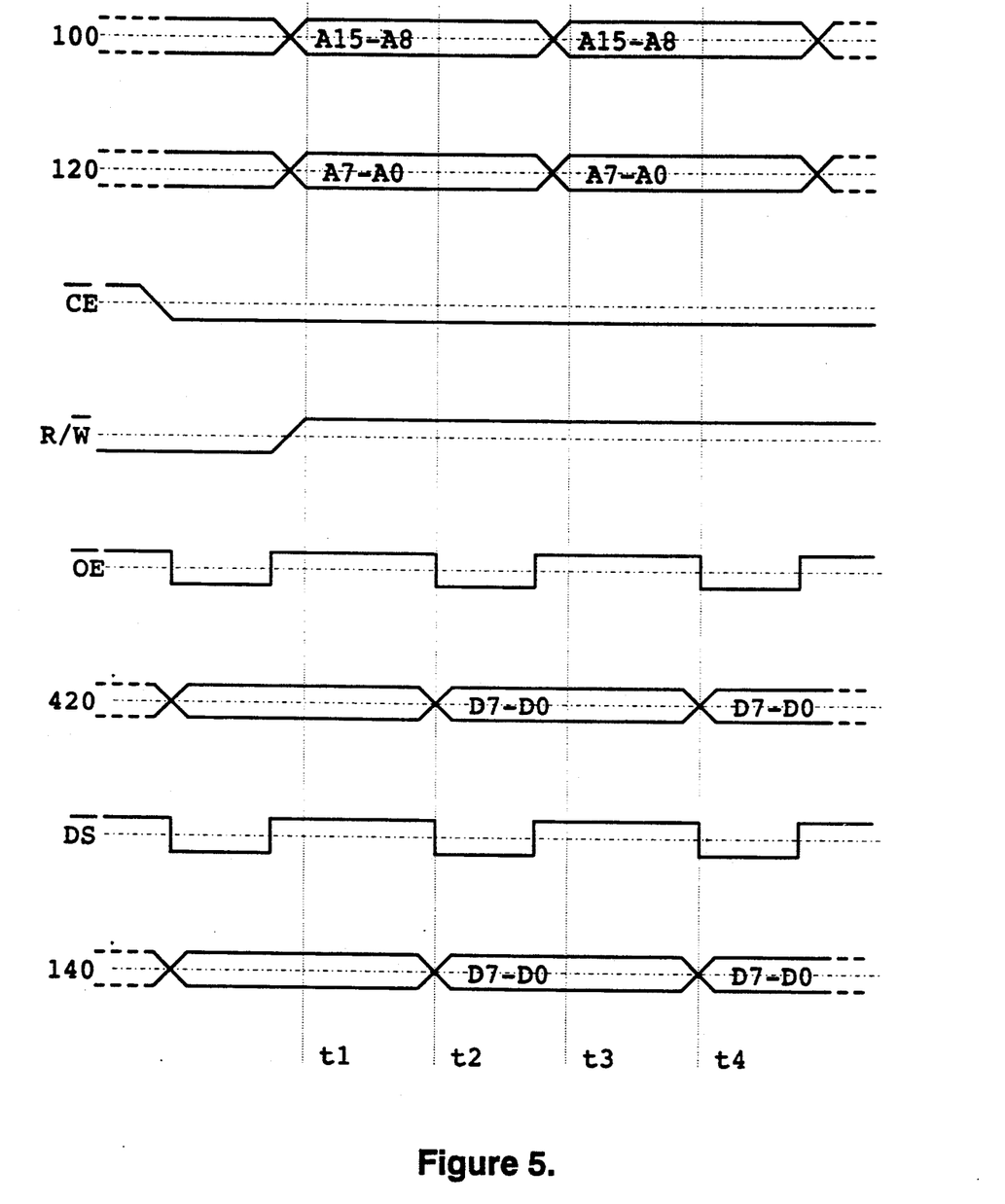
FIG. 5 illustrates timing diagrams for the address, data and control signals from and to the electronic device (5) and to and from the 32K×8 EEPROM (40)

FIG. 5 illustrates the timing diagrams for reading data from the 32K×8 EEPROM 40 to the electronic device 5. First, the electronic device 5 initiates communication with the 32K×8 EEPROM 40 by setting its A15 bit and therefore the chip enable input, $\overline{CE}$, of the 32K×8 EEPROM 40 to LOW. At time t1, the electronic device 5 then transmits a read command to the 32K×8 EEPROM 40 by setting its read/-write, R/$\overline{W}$, line to HIGH. The reading of data from the 32K×8 EEPROM 40 is then subsequently controlled by the electronic device 5 through its data strobe signal, $\overline{DS}$, which is connected to the output enable, $\overline{OE}$, of the 32K×8 EEPROM 40.

At times t2 and t4, the output enable, $\overline{OE}$, of the 32K×8 EEPROM 40 strobes the data, D7-D0, out through its leads 420 to the leads 160 of the electronic device 5. Inside the electronic device 5, the multiplexer 20 then receives the signal from the leads 160 and strobes the data, D7-D0, off of the signal and onto the lines 140 under the control of the data strobe signal, $\overline{DS}$. The electronic circuit 10 then reads the data off of the lines 140.

Referring back to FIG. 4, the data path controller 30 has its chip select, CS, connected to the data memory lead, DM, of the electronic device 5, its multiplexed address/data inputs, A7-A0, D7-D0, connected to the multiplexed address/data leads, AD7-AD0, of the electronic device 5, its address strobe, $\overline{AS}$, and data strobe, $\overline{DS}$, inputs connected to the corresponding outputs of the electronic device 5, and its read/write input, R/$\overline{W}$, connected to the corresponding read/write output, R/$\overline{W}$, of the electronic device 5.

Figure 6:
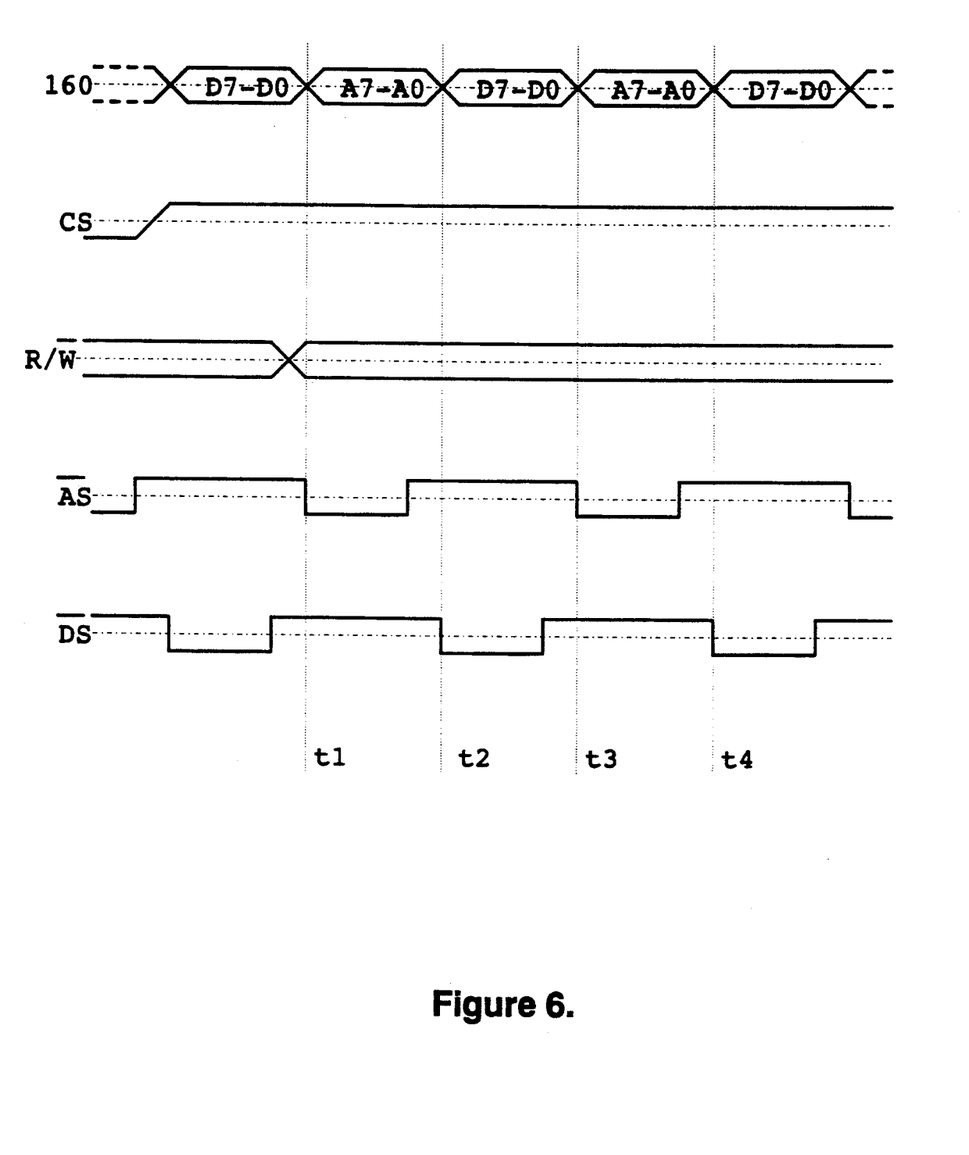
FIG. 6 illustrates timing diagrams for the address, data and control signals from and to the electronic device (5) and to and from the data path controller (30)

FIG. 6 illustrates the timing diagrams for reading and writing data to and from the data path controller 30 to the electronic device 5. First, the electronic device 5 initiates communication with the data path controller 30 by setting its data memory bit, DM, and therefore the chip select input, CS, of the data path controller 30 to HIGH. Around time t1, the electronic device 5 then transmits a read or write command to the data path controller 30 by setting its read/write, R/$\overline{W}$, line to HIGH or LOW, respectively.

The reading or writing of data from or to the data path controller 30 is then subsequently controlled by the electronic device 5 through its address and data strobe signals, $\overline{AS}$ and $\overline{DS}$, which are connected to the corresponding address and data strobe inputs of the data path controller 30.

At times t1 and t3, the address to be read from is strobed off of the signal transmitted from the leads 160 of the electronic device 5 by the address strobe, $\overline{AS}$. At times t2 and t4, the corresponding data which is to be read from or written to the data path controller 30 is strobed by the data address strobe, $\overline{DS}$, from or to the leads 160 by either the data path controller 30 or the electronic device 5. When data is to be sent to the data path controller 30, the multiplexer 20 within the electronic device 5 multiplexes the data bits, D7-D0, with the address bits, A7-A0, as previously described, and when data is to be received from the data path controller 30, the multiplexer 20 de-multiplexes the data bits, D7-D0, off the received signal through leads 160 and transmits only the data bits on lines 140 as previously described in reference to FIG. 3.

A Zilog Z86C94 CMOS Z8 ® Digital Signal Processor is representative of the electronic device 5 described.

Figure 7:
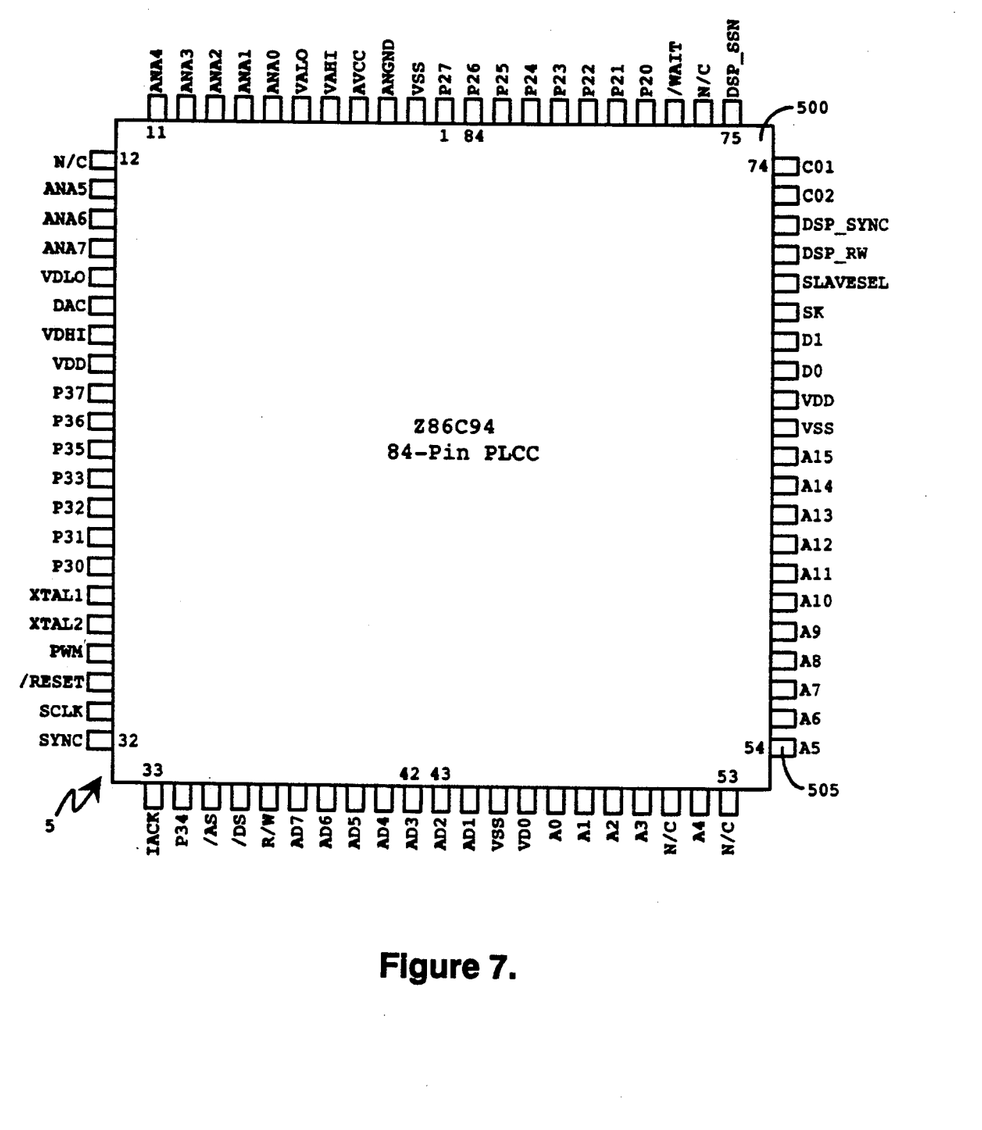
FIG. 7 illustrates, as an example, a package outline for an electronic device utilizing aspects of the present invention.

For example, FIG. 7 illustrates a package outline for the Z86C94, and FIG. 8 describes its I/O pin assignments. In the example, the electronic device 5 (e.g., Z86C94) includes an 84-Pin PLCC package body 500, an electronic circuit enclosed within the 84-Pin PLCC package body 500, and a plurality of I/O leads or contacts (e.g., 505) which are connected, in a conventional manner, to the electronic circuit, and have ends extending out of the package body 500 so that the electronic device 5 can communicate with other electronic devices through the plurality of I/O leads or contacts (e.g., 505).

Although the various aspects of the present invention have been described with respect to a preferred embodiment, it will be understood that the invention is entitled to full protection within the full scope of the appended claims.

What is claimed is:
1. A circuit comprising:
a packaged electronic device having a means, including at least one electronic circuit, for generating and receiving address and data information, a package body enclosing said generating and receiving means, a first plurality of I/O leads connected to said generating and receiving means and having ends extending out of said package body, said first plurality of I/O leads dedicated to communicating said address information, and a second plurality of I/O leads connected to said generating and receiving means and having ends extending out of said package body, said second plurality of I/O leads dedicated to communicating said address information and data information, on an alternating basis, wherein said second plurality of I/O leads has no leads in common with said first plurality of I/O leads, and said second plurality of I/O leads communicates the same address information being communicated by said first plurality of I/O leads,
a first data device having a first and second plurality of electrical contacts, said second plurality of electrical contacts having no contacts in common with said first plurality of electrical contacts, wherein said first and second plurality of electrical contacts of said first data device are respectively connected to said first and second plurality of I/O leads of said packaged electronic device, and
a second data device having a plurality of electrical contacts connected to the second plurality of I/O leads of said packaged electronic device.

2. The circuit as recited in claim 1, wherein said generating and receiving means comprises:
means for generating an address signal which carries said address information, and
means, connected to said address signal generating means, for generating a multiplexed, address/data signal which carries said address information and said data information on an alternating basis.

3. The circuit as recited in claim 2, wherein said first data device includes an output enable contact, said second data device includes first and second input strobe contacts, and said packaged electronic device further includes:
an address strobe lead extending out of said package body,
a data strobe lead extending out of said package body,
means, enclosed within said package body and connected to said address strobe lead, for generating an address strobe signal which indicates when said address information is being communicated through said second plurality of I/O leads, and
means, enclosed within said package body and connected to said data strobe lead, for generating a data strobe signal which indicates when said data information is being communicated through said second plurality of I/O leads,
wherein said address and data strobe leads are connected respectively to said first and second input strobe contacts of said second data device, and said data strobe lead is connected to said output enable contact of said first data device.

* * * * *